US011108746B2

(12) United States Patent
Bhandari et al.

(10) Patent No.: US 11,108,746 B2
(45) Date of Patent: Aug. 31, 2021

(54) SENDING A CRYPTOGRAM TO A POS WHILE DISCONNECTED FROM A NETWORK

(71) Applicant: American Express Travel Related Services Company, Inc., New York, NY (US)

(72) Inventors: Naresh Bhandari, Phoenix, AZ (US); Manish K. Deliwala, Chandler, AZ (US); Ajay Maddukuri, Phoenix, AZ (US); John G. McDonald, Eugene, OR (US); Curtis Watson, Aubrey, TX (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 57 days.

(21) Appl. No.: 15/988,606

(22) Filed: May 24, 2018

(65) Prior Publication Data

US 2018/0278589 A1    Sep. 27, 2018

Related U.S. Application Data

(63) Continuation of application No. 14/959,744, filed on Dec. 4, 2015, now Pat. No. 10,009,324.

(Continued)

(51) Int. Cl.
| | |
|---|---|
| *H04L 29/06* | (2006.01) |
| *G06Q 20/40* | (2012.01) |
| *H04W 12/041* | (2021.01) |
| *H04L 9/08* | (2006.01) |
| *H04W 4/80* | (2018.01) |

(52) U.S. Cl.
CPC ..... *H04L 63/0435* (2013.01); *G06Q 20/4012* (2013.01); *H04L 63/067* (2013.01); *H04W 12/041* (2021.01); *H04L 9/0894* (2013.01); *H04L 63/083* (2013.01); *H04L 2209/56* (2013.01); *H04L 2463/061* (2013.01); *H04L 2463/062* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,170,058 B1 | 1/2001 | Kausik | |
| 7,181,017 B1 * | 2/2007 | Nagel | H04L 9/0825 380/282 |

(Continued)

OTHER PUBLICATIONS

USPTO; Non-Final Office Action dated Jun. 1, 2017 in U.S. Appl. No. 14/959,744.

(Continued)

*Primary Examiner* — Michael W Chao
(74) *Attorney, Agent, or Firm* — Thomas Horstemeyer, LLP

(57) ABSTRACT

A system is configured for detecting a point of sale, receiving a personal identification number (PIN), generating a PIN based key using a message digest of the PIN, decrypting a data encryption key (DEK) using the PIN based key, and generating a DEK based dynamic key using the PIN based key. The system may also decrypt a session key using the DEK based dynamic key, generate a cryptogram from the session key, and send the cryptogram to the point of sale.

19 Claims, 5 Drawing Sheets

Related U.S. Application Data

(60) Provisional application No. 62/186,196, filed on Jun. 29, 2015.

(56) References Cited

U.S. PATENT DOCUMENTS

| | | | | |
|---|---|---|---|---|
| 7,711,152 | B1* | 5/2010 | Davida | G06F 21/32 340/5.53 |
| 7,765,162 | B2* | 7/2010 | Binder | G06Q 20/04 705/64 |
| 7,766,244 | B1* | 8/2010 | Field | G06Q 20/357 235/493 |
| 7,922,080 | B1* | 4/2011 | Doland | G07F 19/206 235/379 |
| 7,926,714 | B1* | 4/2011 | Zhu | G06Q 20/363 235/380 |
| 9,942,034 | B2* | 4/2018 | Le Saint | H04L 9/0844 |
| 9,953,373 | B2* | 4/2018 | Winters | G06Q 20/10 |
| 10,438,187 | B2* | 10/2019 | Guise | G06Q 20/4012 |
| 10,440,013 | B2* | 10/2019 | De Jong | G06K 19/07716 |
| 10,460,314 | B2* | 10/2019 | Hird | H04L 63/062 |
| 10,515,359 | B2* | 12/2019 | Collinge | G06Q 20/322 |
| 10,679,197 | B1* | 6/2020 | Gantert | G06Q 20/3278 |
| 10,846,155 | B2* | 11/2020 | Kachare | G06F 13/4221 |
| 10,855,451 | B1* | 12/2020 | Allo | G06F 21/78 |
| 10,872,333 | B2* | 12/2020 | Dua | G06Q 20/327 |
| 10,902,423 | B2* | 1/2021 | Radu | G06Q 20/36 |
| 10,929,572 | B2* | 2/2021 | Wu | G06F 21/80 |
| 10,949,844 | B2* | 3/2021 | Dryer | G06Q 20/36 |
| 10,977,651 | B2* | 4/2021 | Van Os | G06Q 20/10 |
| 2007/0067833 | A1* | 3/2007 | Colnot | H04L 9/3271 726/9 |
| 2008/0301057 | A1* | 12/2008 | Oren | G06F 21/31 705/71 |
| 2009/0124234 | A1* | 5/2009 | Fisher | G06Q 20/32 455/406 |
| 2010/0106581 | A1* | 4/2010 | Etheredge | G06Q 30/02 705/14.17 |
| 2010/0153267 | A1 | 6/2010 | Ghaidan | |
| 2011/0126024 | A1* | 5/2011 | Beatson | G06F 21/32 713/186 |
| 2011/0196788 | A1* | 8/2011 | Lu | G06Q 20/105 705/41 |
| 2011/0060913 | A1 | 10/2011 | Hird | |
| 2011/0302420 | A1* | 12/2011 | Davida | G06F 21/32 713/180 |
| 2012/0116902 | A1* | 5/2012 | Cardina | G06Q 20/204 705/17 |
| 2012/0310774 | A1* | 12/2012 | Chassin | G06Q 20/227 705/26.41 |
| 2012/0310826 | A1* | 12/2012 | Chatterjee | G06Q 20/326 705/41 |
| 2013/0179281 | A1 | 7/2013 | White | |
| 2013/0262317 | A1* | 10/2013 | Collinge | G06Q 20/3823 705/71 |
| 2014/0040127 | A1* | 2/2014 | Chatterjee | G06Q 20/325 705/41 |
| 2014/0236842 | A1 | 4/2014 | Salminen | |
| 2014/0281571 | A1* | 9/2014 | Federspiel | G06F 21/6209 713/189 |
| 2014/0365782 | A1* | 12/2014 | Beatson | G06F 21/32 713/186 |
| 2015/0006386 | A1 | 1/2015 | Tebbe | |
| 2015/0019442 | A1* | 1/2015 | Hird | H04L 63/062 705/71 |
| 2015/0100499 | A1* | 4/2015 | Dua | G06Q 20/38215 705/76 |
| 2015/0143125 | A1 | 5/2015 | Nix | |
| 2015/0178724 | A1* | 6/2015 | Ngo | H04L 9/0869 705/71 |
| 2015/0248668 | A1 | 9/2015 | Radu | |
| 2015/0278795 | A1 | 10/2015 | Jiang | |
| 2015/0339664 | A1* | 11/2015 | Wong | H04L 9/3234 705/71 |
| 2015/0348006 | A1* | 12/2015 | Taveau | G06Q 20/3224 455/456.2 |
| 2016/0065370 | A1* | 3/2016 | Le Saint | H04L 9/0841 713/155 |
| 2016/0104154 | A1* | 4/2016 | Milov | G06Q 20/3674 705/67 |
| 2016/0162889 | A1* | 6/2016 | Badenhorst | G06Q 20/42 705/44 |
| 2016/0189135 | A1* | 6/2016 | Hird | G06Q 20/3224 705/21 |
| 2018/0341606 | A1* | 11/2018 | Bolkhovitin | G06F 3/0656 |
| 2019/0163364 | A1* | 5/2019 | Gibb | G06F 3/0629 |
| 2020/0051059 | A1* | 2/2020 | Filler | G06Q 20/3274 |
| 2020/0210069 | A1* | 7/2020 | Singh | G06F 9/45558 |
| 2021/0004797 | A1* | 1/2021 | Makhotin | G06Q 20/326 |
| 2021/0081927 | A1* | 3/2021 | Tang | G06Q 20/322 |
| 2021/0103911 | A1* | 4/2021 | Angrish | G06Q 20/20 |

OTHER PUBLICATIONS

USPTO; Final Office Action dated Oct. 12, 2017 in U.S. Appl. No. 14/959,744.

USPTO; Advisory Action dated Nov. 20, 2017 in U.S. Appl. No. 14/959,744.

USPTO; Notice of Allowance dated Apr. 27, 2018 in U.S. Appl. No. 14/959,744.

* cited by examiner

SENDING A CRYPTOGRAM TO A POS WHILE DISCONNECTED FROM A NETWORK

CROSS-REFERENCE TO RELATED APPLICATIONS

This application is a continuation of, claims priority to and the benefit of, U.S. Ser. No. 14/959,744 filed Dec. 4, 2015 and entitled "HOST CARD EMULATION SYSTEMS AND METHODS". The '744 application claims priority to and the benefit of, U.S. Provisional Patent Application Ser. No. 62/186,196, filed Jun. 29, 2015 and entitled "HOST CARD EMULATION SYSTEMS AND METHODS." All of which are incorporated herein in their entirety by reference for all purposes.

FIELD

The present disclosure relates to digital wallet purchases on mobile devices with or without a connection to a transaction account issuer network.

BACKGROUND

Credit cards, debit cards and other transaction cards may be offered with embedded integrated circuit chips to provide heightened security for point-of-sale transactions. Digital wallets streamline the payment protocol for transactions (e.g., purchases) both online via in-application payments and in store via near field communication (NFC). As more users acquire digital devices, the availability of digital wallet applications increases. As a result, transaction account information may be a target for theft and fraud. Thus, techniques for executing digital wallet transactions may be subjected to attempts to steal purchase account information. In that regard, communications and storage of critical purchase account information may be present significant security threats. Host Card Emulation (HCE) may provide some basic functionality to enable smartphones and other devices to use security similar to that of the embedded chips in cards.

Digital wallets may use network communications to authorize transactions using a limited use payment credential (LUPC) and/or other one-time key that is typically not stored on a device due to security limitations. The transactions may be dependent on network connectivity to acquire an LUPC at the time of a transaction. Thus, in stores without reliable network connections, digital wallet transactions may not be available to a mobile device that uses a network connection to retrieve a limited use key.

SUMMARY

A system, method, and computer readable medium (collectively, the "system") is disclosed for completing digital wallet transactions using locally stored session keys. The system may include a processor configured to perform operations and/or steps comprising detecting a point of sale, receiving a personal identification number (PIN), generating a PIN based key using a message digest of the PIN, decrypting a data encryption key (DEK) using the PIN based key, and generating a DEK based dynamic key using the PIN based key. The processor may also decrypt a session key using the DEK based dynamic key, generate a cryptogram from the session key, and send the cryptogram to the point of sale.

In various embodiments, the system may include obfuscating, by the processor, encryption protocols used to decrypt the DEK and the session key. The processor may delete the session key after a predetermined age. The processor may also delete the session key in response to the sending the cryptogram to the point of sale. The system may also include getting, by the processor, a new session key from an HCE cloud component in response to detecting a number of session keys stored on a user device below a threshold. The processor may encrypt the new session key using the PIN based key, and the new session key using the DEK based dynamic key. The processor may be disconnected from an Internet during the generating the cryptogram from the session key.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, a "digital wallet" includes a software and/or electronic device that facilitates individual e-commerce and m-commerce transactions. The digital wallet may operate by aggregating the transaction account holder's payment and/or billing information, serving as the merchant of record, and/or passing through the transaction account holder's payment and/or billing information to the end merchant. Examples of some of the more popular digital wallets currently available may include Apple Pay®, Passbook®, and Google Wallet™.

The present disclosure provides a system, method, and computer program product for using a digital wallet on a user device for transactions (e.g., purchases) while the user device is partially or fully disconnected from the Internet. The user device may use a session key such as a limited use purchase credentials (LUPC). The LUPC may be distributed by the issuer. The LUPC may authorize web purchases and/or point of sale purchases. The LUPC may be stored on the user device in a secure manner using, for example, layered encryption, which can include obfuscation such as white box cryptography. The layered security protecting the LUPC and encryption algorithms tend to protect the LUPC long enough that the LUPC expires before an attacker can break the security. Thus, a user device may contact an issuer server or cloud network to retrieve one or more LUPCs when the user device is online. The device may use one of the previously-retrieved and securely-stored LUPCs to authorize a point-of-sale and/or web purchase without the user device having online connectivity at the time of the sale. Applications of the present disclosure may thus enhance usability of digital wallets in a secure manner and enhance the user experience and expedite processing.

Figure 1:
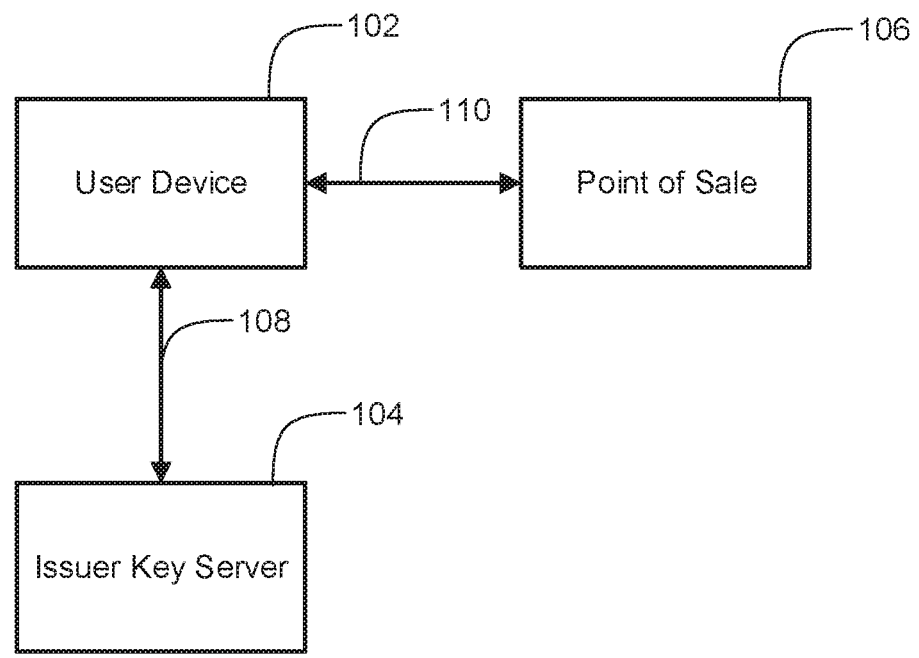
FIG. 1 illustrates an exemplary system for carrying out digital wallet transactions using HCE on a mobile device, in accordance with various embodiments.

With reference to FIG. 1, system 100 for transactions (e.g., purchases) using a digital wallet is shown, in accordance with various embodiments. System 100 may comprise a user device 102. User device 102 may comprise any device capable of receiving and displaying an electronic message via a network 108. For example, user device 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over network 108. User device 102 may communicate with point of sale 106 over a network 110. Network 108 may comprise the Internet and network 110 may comprise a near field communications (NFC) link available at point of sale 106. User device 102 may also communicate over network 108 with issuer key server 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, TDEA, AES, ECC, PM, GPG (GnuPG), and symmetric and asymmetric cryptosystems.

In various embodiments, issuer key server 104 may be one or more servers acting individually or in concert in a cloud configuration. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Figure 2:
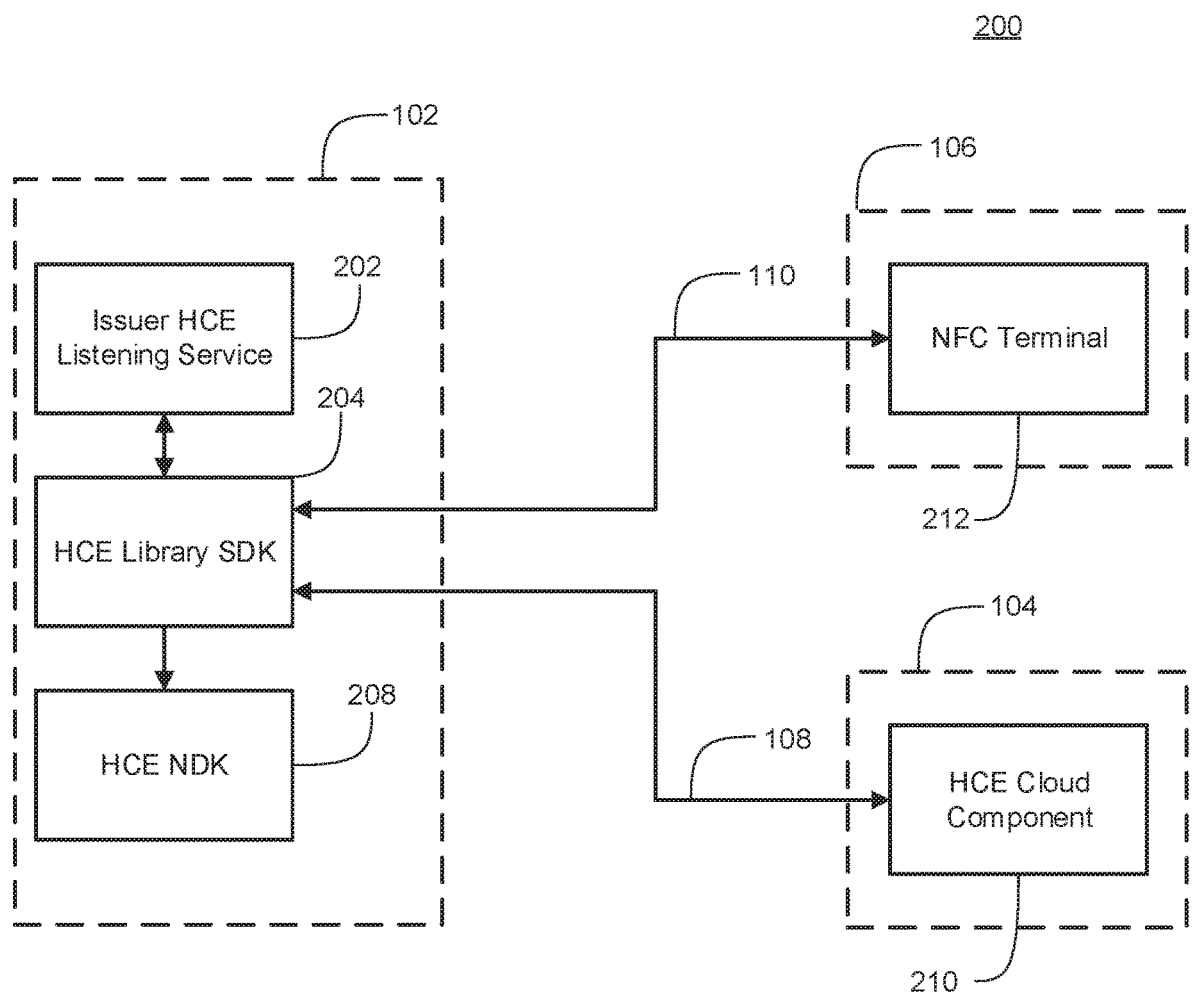
FIG. 2 illustrates exemplary software and hardware components for securing sensitive HCE data and functionality on a user device, in accordance with various embodiments.

With reference to FIG. 2, an exemplary system for conducting point of sale transactions using a digital wallet on user device 102 is shown, in accordance with various embodiments. User device 102 may be a mobile device running host card emulation (HCE) software to provide mobile wallet security. For example, user device 102 may be a smartphone running an Android® operating system, which contains an HCE library. HCE software may provide software based security similar to a chip-in-card system without a secure element built into the mobile device. User device 102 may communicate over network 110 with NFC terminal 212 to complete a transaction at point of sale 106.

User device 102 may run an HCE library software development kit 204 (SDK) to communicate with an HCE cloud component running on an issuer key server 104. The communication may take place over network 108 at a time prior to a purchase at point of sale 106. The HCE Library SDK 204 may include an API and functionality offered by the digital wallet provider for use in creating digital wallet functionality on user device 102. The HCE Library SDK 204 on user device 102 may enable user device 102 to transmit and receive data (e.g., LUPCs) to and from HCE cloud component 210. An Issuer HCE listening service may collect and provide details such as an account ID, a user ID, an alias, a pin message digest, and/or an action ID.

In various embodiments, the HCE Library SDK 204 may communicate with the HCE native development kit 208 (NDK). The native development kit may enable use of custom written functionality on user device 102. For example, the HCE NDK 208 may include cryptography functions and transformation functions that are not offered by the wallet provider and not native to the operating system of user device 102. In that regard, the HCE NDK 208 may be used to implement code obfuscation and encrypt the LUPC using algorithms that are not known to the general public.

Figure 3:
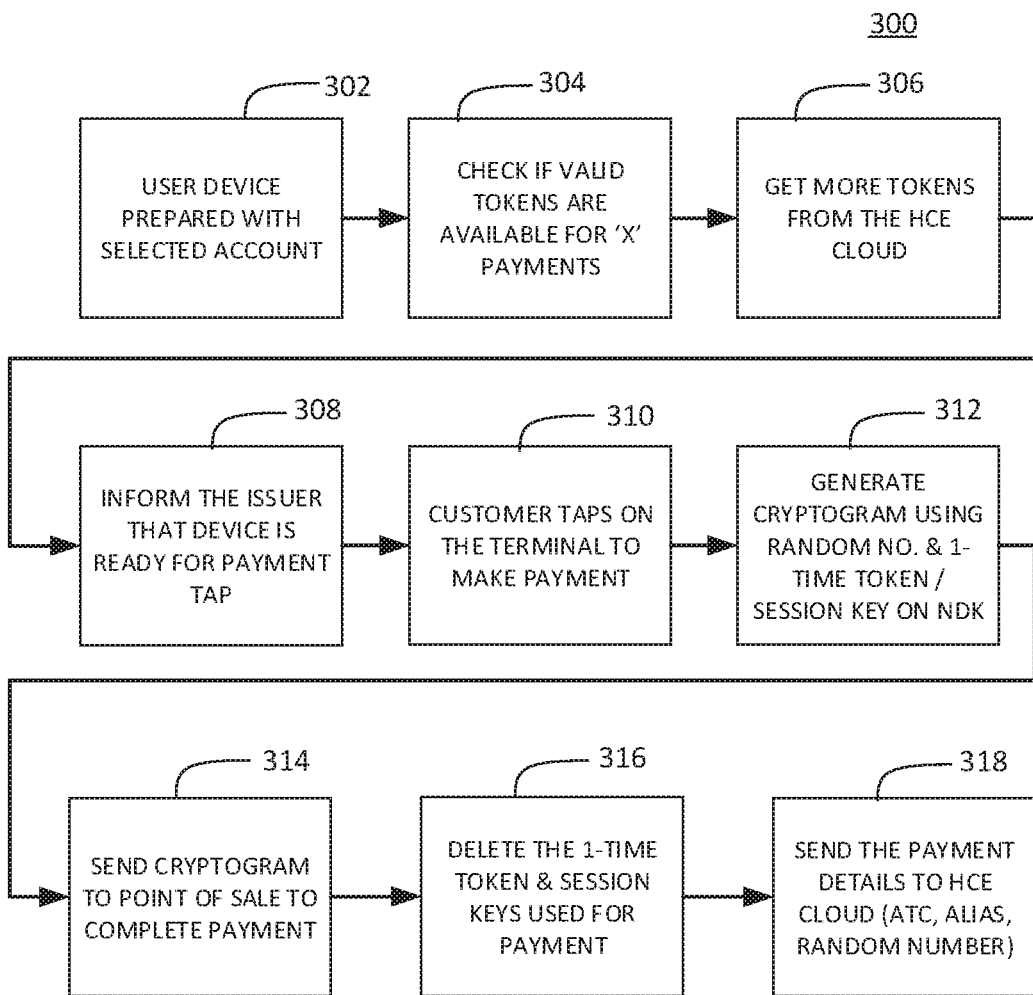
FIG. 3 illustrates a process for carrying out digital wallet transactions on a user device with a locally stored session key, in accordance with various embodiments.

With reference to FIG. 3, a process 300 for carrying out digital wallet transactions on a system 200 with locally stored session keys is shown, in accordance with various embodiments. User device 102 may be prepared with a selected account in the digital wallet (Step 302). The transaction account may be selected by a prompt on user device 102. User device 102 may then check if valid tokens (i.e., one-time session keys such as LUPCs) are available for the payment (Step 304). The tokens may also be time limited or limited to a number of uses. For example, tokens may be set to expire after a predetermined time duration such as in 1/10 the time projected to break the security used on user device 102. User device 102 may destroy tokens reaching the use limit or age limit. User device 102 may then get more tokens from HCE cloud component 210 (Step 306). User device 102 may request additional tokens in response to a number of tokens available falling below a minimum threshold, or the tokens present on user device 102 being near expiration. User device 102 may check for tokens on regular intervals or in response to device state changes, such as when a device first connects to a network. In response to tokens being received from HCE cloud component 210, the tokens are encrypted and stored. For example, the tokens may be stored on the device with layered encryption comprising both PBK and CDEK encryption layers.

In various embodiments, user device 102 may inform the issuer that user device 102 is ready for payment tap at NFC terminal 212 (Step 308). A user may then tap user device 102 on the NFC terminal 212 to make a payment (Step 310). In response to the NFC communication resulting from the tap, user device 102 may generate a cryptogram using a random number and the one-time token on the HCE NDK (Step 312), as illustrated below with reference to FIG. 4. User device 102 may then send the cryptogram to point of sale 106 to complete payment (Step 314). In response to the payment being deleted, user device 102 may delete the one-time token and session keys used for payment (Step 316). By deleting one-time tokens and session keys after a single use system 200 reduces the risk of replay attacks. User device 102 may send payment details to HCE cloud component 210, including an account transaction number (generated using the LUPC), the purchase account alias, and the random number (Step 318). Process 300 may include the HCE NDK 208 functionality of FIGS. 4 and 5.

Figure 4:
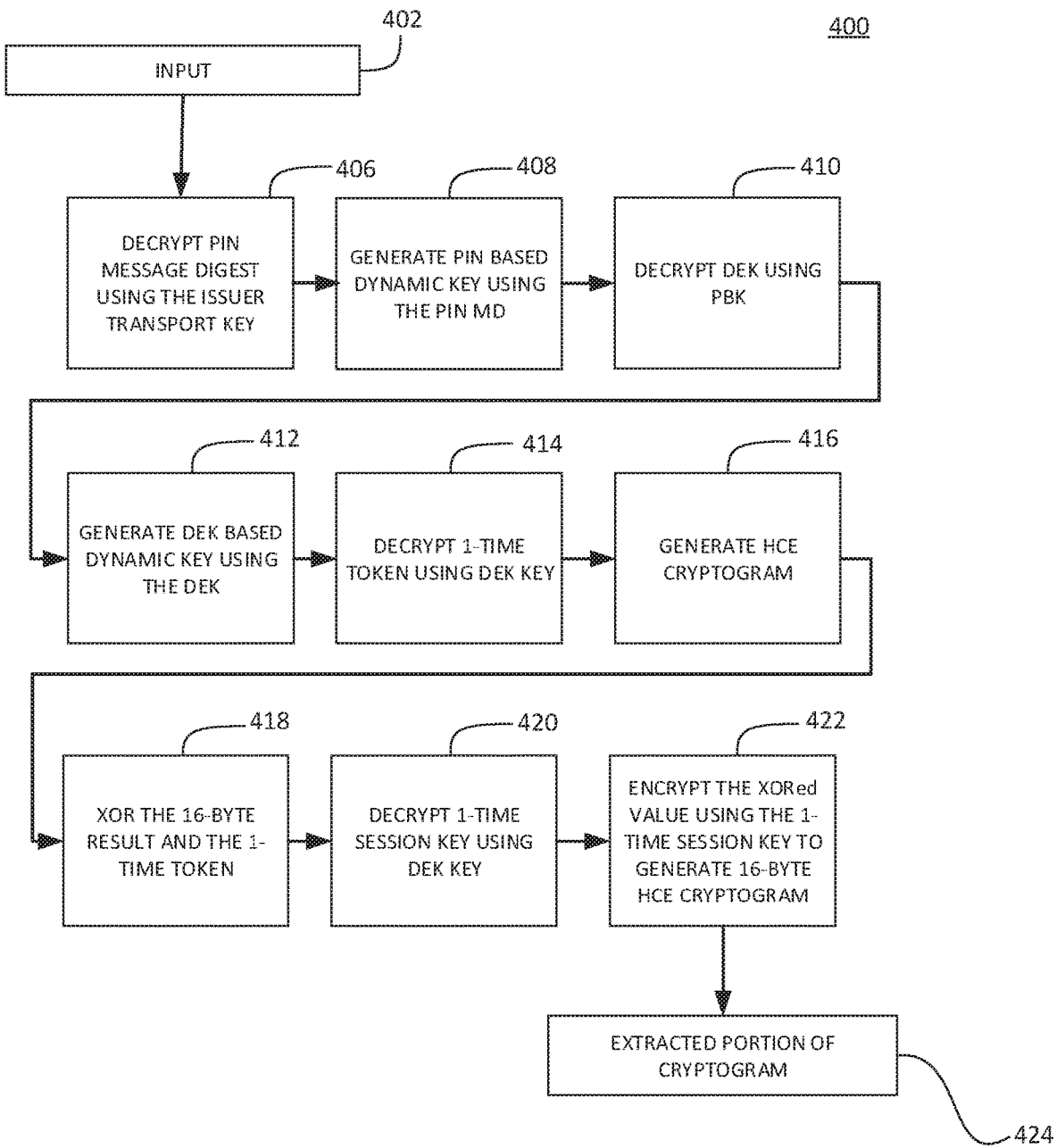
FIG. 4 illustrates a process for securely retrieving and storing a session key on a user device, in accordance with various embodiments.

With reference to FIG. 4, a cryptography process 400 of HCE NDK 208 is shown, in accordance with various embodiments. The process may begin with input 402 provided to HCE NDK 208. Input 402 may include a random number, a one-time token, a one-time session key, an IST encrypted PIN message digest, and a data encryption key (DEK) encrypted by a PIN based encryption key (PBK). The IST may be a static key, and the PBK and DEK may be dynamic keys. The IST may also be, for example, an asymmetric public key issued by a transaction account issuer and paired with a private key retained in secrecy by the transaction account issuer. The PBK may be generated by applying a hash function to a PIN entered into user device 102 by a user.

In various embodiments, user device 102 may then decrypt the PIN message digest from input 402 using the IST (Step 406). User device may further generate a PIN based dynamic key using the decrypted PIN message digest and white box cryptography functions. White box cryptography solutions (provided by third party vendors such as ARXAN or CRYPTOMATHIC) may offer code obfuscation and cryptography libraries having, for example, an application programming interface available for calling functions, providing input, and receiving return values. User device 102 may generate the PBK using the PIN message digest and white box cryptography function calls (Step 408). The PBK generation algorithm may be obfuscated and otherwise hidden on user device 102 to increase the difficulty of reverse engineering the PBK generation algorithm.

In various embodiments, user device 102 may decrypt the DEK using the PBK (Step 410). The DEK may then be used to generate a DEK based dynamic key (DEK Key) using the DEK and white box cryptography (Step 412). The DEK Key generation algorithm may be obfuscated and otherwise hidden on user device 102 to increase the difficulty of reverse engineering the DEK Key generation algorithm. User device 102 may then decrypt a one-time token using the DEK Key (Step 414). User device 102 may then generate an HCE Cryptogram (Step 416). User device 102 may generate, for example, a 16-byte number by padding a 4-byte random number with 2 hex zeros on the left and 10 hex zeros on the right. The user device 102 may then apply an exclusive or (XOR) operator to the 16-byte padded number and the one-time token using white box cryptography (Step 418).

In various embodiments, user device 420 may decrypt a one-time session key (i.e., an LUPC) using the DEK Key. The one-time session key may be stored locally on user device 102 using a layered encryption system. User device 102 may then encrypt the XORed value from Step 418 using the one-time session key to generate a HCE Cryptogram (Step 422). The HCE cryptogram may be 16 bytes long in various embodiments depending on the cryptography algorithm used. User device 102 may extract a portion of the cryptogram as an output 424. For example, user device 102 may extract left most 8-bytes of the cryptogram as output 424.

Figure 5:
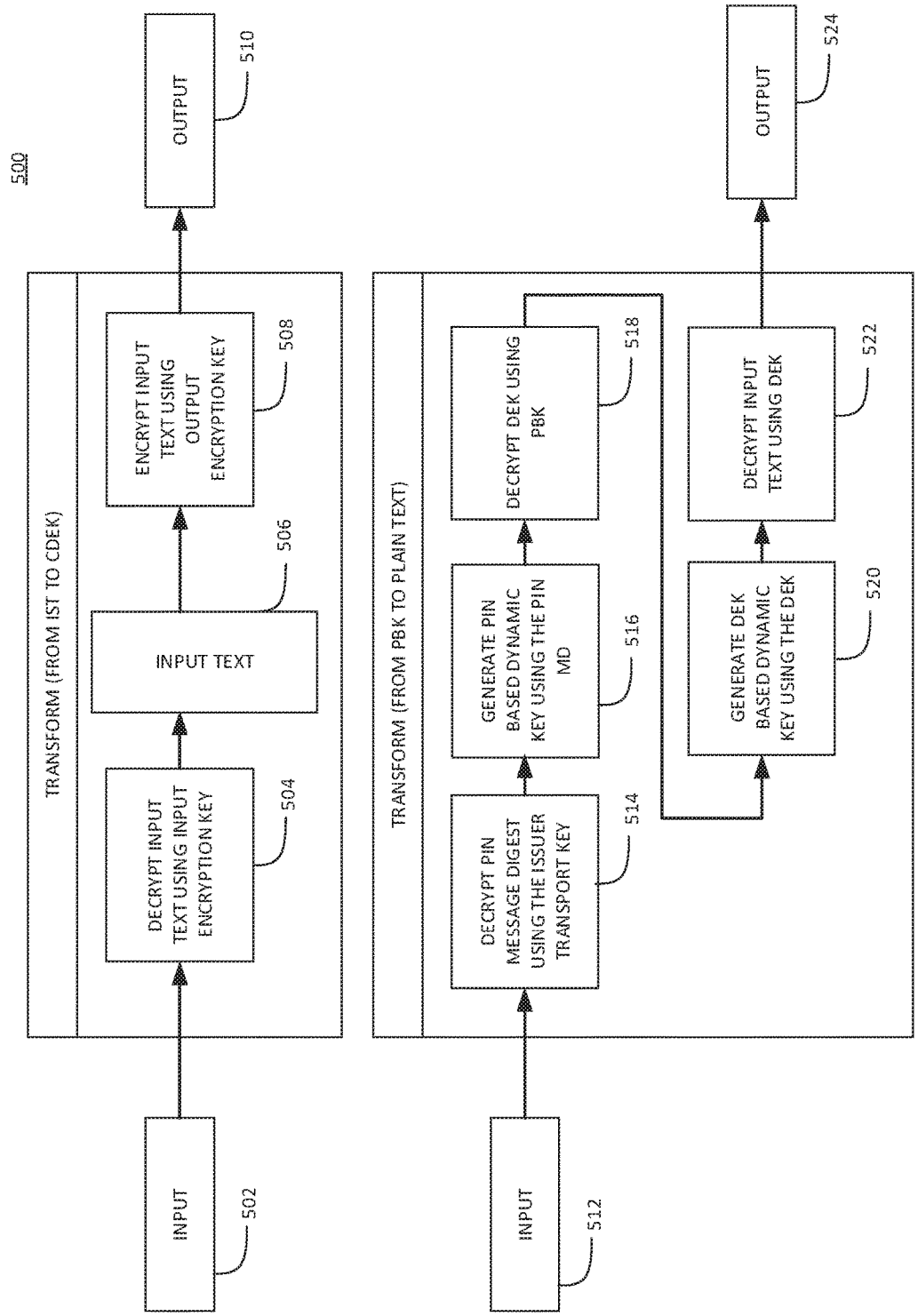
FIG. 5 illustrates a cryptography process for generating a payment cryptogram using a locally stored session key, in accordance with various embodiments.

With reference to FIG. 5, a transformation system 500 of HCE NDK 208 is shown, in accordance with various embodiments. Transformation system 500 may transform data encrypted with one key to data encrypted in another key (or in plain text). Two exemplary transforms of Transformation system 500 are shown. The transformation from IST to CDEK (client data encryption key) based encryption begins with input 502. Input 502 may include input text (i.e. a key and a value), input encryption (i.e., IST), output encryption (i.e., CDEK encrypted data), an IST encrypted PIN message digest, and a PBK encrypted DEK.

In various embodiments, user device 102 may decrypt the input text using the input encryption key and the white box cryptography API (Step 504). For example, the input may be decrypted using the IST as indicated in input 502. The output may be a plain text value and a CDEK used as input to the following encryption process (Step 506). User device 102 may then encrypted the input text from Step 506 using an encryption key and white box cryptography API (Step 508). For example, output 510 may be the input converted to a desired CDEK encryption, as indicated by requesting CDEK encryption in input 502. Other input and output encryption protocols may also be used in place of IST and/or CDEK in the foregoing transform, for example, the transform may convert IST encrypted data to CTK encrypted data.

In various embodiments, the transform from PBK encryption to plain text may begin with an input 512. Input 512 may include input text (i.e. a key and a value) encrypted with DEK, input encryption (i.e., PBK), output encryption (i.e., plain text), an IST encrypted PIN message digest, and a PBK encrypted DEK. User device 102 may then decrypt the PIN message digest from input 512 using the IST (Step 514). User device 102 may further generate a PIN based dynamic key using the decrypted PIN message digest and white box cryptography functions (Step 516). User device 102 may decrypt the DEK using the PBK (Step 518). The DEK may then be used to generate a DEK Key using the DEK and white box cryptography APIs (Step 520). The DEK Key generation algorithm may be obfuscated and otherwise hidden on user device 102 to increase the difficulty of reverse engineering the DEK Key generation algorithm. The DEK Key may be used to decrypt text (Step 522). The decrypted text may be output 524 in plain text.

The systems and methods herein enable secure storage of one-time keys to enable digital wallet transactions with a partial or no Internet connection. Additionally, the layered security approach to protecting the stored keys provides robust protection for the life of the keys. Additional layers of encryption and obfuscation may be added to improve protection.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The phrases consumer, customer, user, account holder, account affiliate, account member or the like shall include any person, entity, business, government organization, business, software, hardware, machine associated with a transaction account, buys merchant offerings offered by one or more merchants using the account and/or who is legally designated for performing transactions on the account, regardless of whether a physical account is associated with the account. For example, the account member may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, and JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, PALM®OS®, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a PALM® mobile operating system, a WINDOWS® mobile operating system, an ANDROID® Operating System, APPLE® IOSC), a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "card member", "business" or "merchant" may be used interchangeably with each other, and each shall mean any person, entity, government organization, business, machine, hardware, and/or software. A bank may be part of the system, but the bank may represent other types of account issuing institutions, such as credit account companies, account sponsoring companies, or third party issuers under contract with financial institutions. It is further noted that other participants may be involved in some phases of the transaction, such as an intermediary settlement institution, but these participants are not shown.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WIN- DOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone account, embossed account, smart account, magnetic stripe account, bar code account, transponder, radio frequency account or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, account, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart account"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a motion, a measurement and/or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit account companies, account sponsoring companies, or third party issuers under contract with financial institutions. It is further noted that other participants may be involved in some phases of the transaction, such as an intermediary settlement institution.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   displaying, by a user device, a prompt for a selection of a transaction account;
   determining, by the user device, that an encrypted limited use purchase credential (LUPC) is available for the transaction account that has been selected;
   retrieving, by the user device, a new LUPC while the user device is connected to a network in response to detecting a number of LUPCs stored on the user device is below a threshold;
   decrypting, by the user device, the encrypted LUPC using a data encryption key (DEK) based dynamic key to create a LUPC;
   wirelessly connecting, by the user device, with a point of sale;
   generating, by the user device, a cryptogram from the LUPC in response to wirelessly connecting with the point of sale; and
   sending, by the user device, the cryptogram to the point of sale, wherein the cryptogram is used to authorize a purchase through the wireless connection between the user device and the point of sale.

2. The method of claim 1, further comprising obfuscating, by the user device, encryption protocols used to decrypt the LUPC.

3. The method of claim 1, further comprising deleting, by the user device, the LUPC after a predetermined duration.

4. The method of claim 1, further comprising deleting, by the user device, the LUPC in response to the sending of the cryptogram to the point of sale.

5. The method of claim 1, wherein the new LUPC is retrieved from a host card emulation (HCE) cloud component.

6. The method of claim 1, further comprising encrypting, by the user device, the new LUPC using a personal identification number (PIN) based key.

7. The method of claim 6, further comprising encrypting, by the user device, the new LUPC using the DEK based dynamic key.

8. The method of claim 1, further comprising detecting, by the user device, the point of sale.

9. The method of claim 1, further comprising receiving, by the user device, a personal identification number (PIN).

10. The method of claim 1, further comprising generating, by the user device, a personal identification number (PIN) based key using a message digest of the PIN based key.

11. The method of claim 1, wherein the LUPC is stored on the user device.

12. The method of claim 1, wherein a transaction is completed based on the cryptogram in an online payment transaction mode.

13. The method of claim 1, further comprising generating, by the user device, a personal identification number (PIN) based key using a PIN.

14. The method of claim 1, further comprising:
   generating, by the user device, the DEK based dynamic key using a personal identification number (PIN) based key.

15. A user device, comprising:
   a processor; and a tangible, non-transitory memory configured to communicate with the processor, the tangible, non-transitory memory having instructions stored thereon that, in response to execution by the processor, cause the processor to perform operations comprising:
   displaying, by the processor, a prompt for a selection of a transaction account;

determining, by the processor, that an encrypted limited use purchase credential (LUPC) is available for the transaction account that has been selected;

retrieving, by the processor, a new LUPC while the user device is connected to a network in response to detecting a number of LUPCs stored on the user device is below a threshold;

decrypting, by the processor, the encrypted LUPC using a data encryption key (DEK) based dynamic key to create a LUPC;

generating, by the processor, a cryptogram from the LUPC in response to wirelessly connecting with a point of sale; and sending, by the processor, the cryptogram to the point of sale while the user device is without the connection to the network, wherein the cryptogram is used to authorize a purchase through the wireless connection between the user device and the point of sale.

16. The user device of claim 15, wherein a transaction is completed based on the cryptogram in an online payment transaction mode.

17. The user device of claim 15, further comprising generating, by the processor, the DEK based dynamic key using a personal identification number (PIN) based key.

18. An article of manufacture including a non-transitory, tangible computer readable storage medium having instructions stored thereon that, in response to execution by a processor of a user device, cause the processor to perform operations comprising:

displaying, by the processor, a prompt for a selection of a transaction account;

determining, by the processor, that an encrypted limited use purchase credential (LUPC) is available for the transaction account that has been selected;

retrieving, by the processor, a new LUPC while the user device is connected to a network in response to detecting a number of LUPCs stored on the user device is below a threshold;

decrypting, by the processor, the encrypted LUPC using a data encryption key (DEK) based dynamic key to create a LUPC;

wirelessly connecting, by the processor, with a point of sale;

generating, by the processor, a cryptogram from the LUPC in response to wirelessly connecting with the point of sale; and sending, by the processor, the cryptogram to the point of sale, wherein the cryptogram is used to authorize a purchase through the wireless connection between the user device and the point of sale.

19. The article of manufacture of claim 18, wherein the instructions, in response to execution by the processor of the user device, cause the processor to perform operations comprising:

encrypting, by the processor, the new LUPC using the DEK based dynamic key.

* * * * *